(12) United States Patent
Albesiano et al.

(10) Patent No.: US 11,933,374 B2
(45) Date of Patent: Mar. 19, 2024

(54) SADDLE-RIDE TYPE VEHICLE COMPRISING A CLUTCH ASSEMBLY AND A CONTROL DEVICE FOR SAID CLUTCH ASSEMBLY

(71) Applicant: Piaggio & C. S.p.A., Pontedera (IT)

(72) Inventors: Romano Albesiano, Pontedera (IT); Walter Scattolin, Pontedera (IT); Francesco Grisotolo, Pontedera (IT)

(73) Assignee: Piaggio & C. S.p.A., Pontedera (IT)

( * ) Notice: Subject to any disclaimer, the term of this patent is extended or adjusted under 35 U.S.C. 154(b) by 0 days.

(21) Appl. No.: 18/019,834

(22) PCT Filed: Aug. 3, 2021

(86) PCT No.: PCT/IB2021/057075
§ 371 (c)(1),
(2) Date: Feb. 6, 2023

(87) PCT Pub. No.: WO2022/029610
PCT Pub. Date: Feb. 10, 2022

(65) Prior Publication Data
US 2023/0279910 A1    Sep. 7, 2023

(30) Foreign Application Priority Data
Aug. 7, 2020    (IT) .................... 102000000019777

(51) Int. Cl.
*F16D 48/06*    (2006.01)
*F16D 13/56*    (2006.01)

(52) U.S. Cl.
CPC .......... *F16D 48/066* (2013.01); *F16D 13/56* (2013.01); *F16D 2500/1026* (2013.01);
(Continued)

(58) Field of Classification Search
CPC ............ F16D 25/06; F16D 2048/0212; F16D 48/066; F16D 2500/1026–70426;
(Continued)

(56) References Cited

U.S. PATENT DOCUMENTS 8,396,636 B2    3/2013    Minami
9,151,347 B1*  10/2015    Shaw .................... F16D 48/066
(Continued)

FOREIGN PATENT DOCUMENTS

EP    1681487 A1    7/2006
FR    3019124 A1    10/2015
(Continued)

OTHER PUBLICATIONS

Search Report and Written Opinion for corresponding patent application No. PCT/IB2021/057075, dated Dec. 6, 2021.

*Primary Examiner* — Jacob S. Scott
*Assistant Examiner* — Lillian T Nguyen
(74) *Attorney, Agent, or Firm* — Patterson Intellectual Property Law, PC

(57) ABSTRACT

The present invention relates to a saddle-ride type vehicle comprising a clutch assembly (4), interposed between an engine (2) and a gearbox (3), which includes a clutch device (11) in turn comprising two clutch elements (one integral with the shaft of the engine and the other with the input shaft of the gearbox) and return means (12) that keep these elements (11A, 11B) in contact in a closure condition of the clutch. According to the invention, the clutch assembly (4) further comprises an operating device (21) of the clutch device that causes detachment of the elements (11A, 11B) of the clutch device up to an opening condition of the clutch assembly. This latter further comprises a control device (6) to limit the torque peaks during gear change. This device (Continued)

comprises an actuation means (5) that, during gear change, exerts a predetermined force (S) in contrast to the force exerted by said return means (12) of the clutch assembly, wherein said predetermined force (S) is less than the force (F) generated by the return means (12) so as to cause a mutual slip of the elements (11A, 11B) of the clutch device (11) without said opening condition being reached. The operating device (21) is of hydraulic type and comprises a primary pump (22) operated by means of a control lever (23), wherein this primary pump (22) is hydraulically connected, through a primary hydraulic circuit (16), to a primary piston (24) acting on at least one of the elements (11A, 11B) of the clutch device (11) in opposition to the return means (12) so that, following an action on the control lever (23), the primary piston (24) exerts an action the elements (11A, 11B) determining the opening condition. According to the invention, the control device (6) comprises a secondary piston (25) connected to the primary piston (24), wherein the actuation means (5) exerts, directly or indirectly, the predetermined force (S) on the secondary piston (25), said predetermined force (S) being transferred to the primary piston (24) in opposition to the force (F) of the return means (12).

14 Claims, 3 Drawing Sheets

(52) U.S. Cl.
CPC .............. *F16D 2500/10412* (2013.01); *F16D 2500/1045* (2013.01); *F16D 2500/1117* (2013.01); *F16D 2500/31406* (2013.01); *F16D 2500/31466* (2013.01); *F16D 2500/70404* (2013.01); *F16D 2500/70406* (2013.01); *F16D 2500/70426* (2013.01)

(58) Field of Classification Search
CPC ......... F16D 13/00–56; F16D 2013/565; F16D 2048/023; F16D 2048/0296; F16D 48/04; F16D 48/068
See application file for complete search history.

(56) References Cited

U.S. PATENT DOCUMENTS

| | | |
|---|---|---|
| 2008/0208423 A1 | 8/2008 | Minami |
| 2010/0107810 A1* | 5/2010 | Saitoh .................... F16D 13/04 74/664 |
| 2014/0236406 A1* | 8/2014 | Ishida ................... B60W 20/00 903/946 |
| 2021/0088088 A1 | 3/2021 | Ono et al. |

FOREIGN PATENT DOCUMENTS

| | | | |
|---|---|---|---|
| WO | WO-02055910 A1 * | 7/2002 | ............ B60K 6/485 |
| WO | 2008153165 A1 | 12/2008 | |
| WO | 2019087511 A1 | 5/2019 | |

* cited by examiner

SADDLE-RIDE TYPE VEHICLE COMPRISING A CLUTCH ASSEMBLY AND A CONTROL DEVICE FOR SAID CLUTCH ASSEMBLY

TECHNICAL FIELD

The present invention falls within the field of the production of saddle-ride type vehicles, in particular provided with a gearbox of the type known as "seamless". Specifically, the present invention relates to a saddle-ride type vehicle comprising a clutch assembly and a control device of such a clutch assembly, where this device is adapted to limit torque peaks at least during gear changes, i.e. when passing from a gear with a lower transmission ratio to a gear with a higher transmission ratio. The control device is particularly suitable for saddle-ride type vehicles that have a gearbox of seamless type.

BACKGROUND ART

Within the field of saddle-ride type vehicles, those provided with a seamless gearbox are known. With respect to a conventional gearbox, in which it is necessary to stop transmission by activating the clutch and interrupting the power supply to the engine to engage the gear, a seamless gearbox does not require any interruption of torque between the engine and the rear wheel of the vehicle. In practice, the seamless gearbox does not disengage a first gear pair to engage the next one, as occurs in a conventional gearbox, but engages the next gear while the one in use is still meshing. In substance, through a known mechanical system, one of the two gears is disengaged as soon as the next gear starts to transmit torque.

It is also known that besides a reduction of the gear change times between one gear and the next, one of the main advantages of the use of a seamless gearbox lies in the more linear delivery of the torque curve generated by the engine and transmitted to the drive wheel. In this regard, in a conventional gearbox, engaging a new gear translates into a force that modifies, through the chain pull, the load on the rear suspension of the vehicle and ultimately the stability of the vehicle. Therefore, in a condition of bending of the vehicle or during a change in direction, the use of a seamless gearbox is particularly advantageous as the chain pull does not vary significantly and therefore the excursion of the suspension is not modified.

However, if on the one hand a seamless gearbox allows gear change without interrupting the transmission (i.e., without operating the clutch), on the other during a gear "upshift" (i.e., from a gear with a lower transmission ratio to a gear with a higher transmission ratio), this aspect leads to an increase (peak) of the torque at the end of the change. In order to prevent breakage of the mechanical components it is thus necessary to limit these torque peaks. Typically, this result is achieved by acting on the control unit of the engine and more precisely by setting it so that the engine is switched off during the change for sufficient time to prevent the torque peak. This control strategy requires perfect synchronization between the gearbox and the switching off and back on of the engine by the control unit.

However, the Applicant has seen that in certain cases the inertia of the drive shaft is so high that it is not affected by any switching off of the engine commanded by the control unit. In other words, the drive shaft continues to rotate at the same speed. Therefore, currently in a condition of inertia of this type, the use of a seamless gearbox does not seem possible in view of the fact that it is not possible to limit, through the action of the control unit, the torque peaks that would occur when the gears are engaged.

Therefore, the Applicant has identified the need to provide a new technical solution that increases the possibilities of use of a seamless gearbox and at the same time allows simplification of the control unit in terms of strategy implemented.

SUMMARY

The main aim of the present invention is to provide a saddle-ride type vehicle provided with a device for limiting torque peaks during a gear upshift that allows the problems set forth above to be solved. Within this aim, a first object of the present invention is to provide a device that does not require the engine to be switched off and the operation of which is completely independent from the rotation speed of the drive shaft. Another object of the present invention is to provide a device that is reliable and easy to produce at competitive costs.

The Applicant has seen that the aims and the objects indicated above can be reached by causing, at the end of the gear change, a controlled slipping of the clutch (without reaching an opening condition thereof) such as to absorb the torque peak. In particular, the aims and the objects indicated can be achieved by means of a saddle-ride type vehicle comprising an engine, a gearbox and a clutch assembly interposed between the engine and the gearbox, wherein the clutch assembly comprises:

- a clutch device comprising at least one drive element integral with the shaft of said engine, at least one driven element integral with an input shaft di said gearbox and return means that keep said elements in contact in a closure condition of said clutch;
- an operating device of said clutch device to cause, in opposition to said return means, a mutual detachment of said elements up to an opening condition of said clutch device.

The vehicle according to the invention comprises a control device of the clutch assembly, wherein this control device comprises an actuation means that, during a gear change performed by means of the gearbox and following a command of a pilot, exerts a predetermined force in contrast to the load of the return means, this predetermined force being less than the force exerted by the return means so as to cause the clutch device to slip without said opening condition being reached.

Again, according to the invention, the operating device of the clutch assembly is of hydraulic type and comprises a primary pump operated by means of a control lever, wherein the primary pump is hydraulically connected, through a primary hydraulic circuit, to a primary piston acting on at least one of the elements in opposition to the return means so as to determine the opening condition. Moreover, the control device comprises a secondary piston connected to the primary piston of the operating device, wherein this actuation means exerts, directly or indirectly, said predetermined force on the secondary piston, wherein said predetermined force is transferred to the primary piston in opposition to the force exerted by the return means.

In accordance with a possible embodiment, the actuation means can be mechanically activated by the pilot when a gear change, preferably a gear upshift, is required. In substance, the actuation means is controlled, directly or indirectly, by the mechanisms on which the pilot acts to command the gear change. In this embodiment, activation of the actuation means does not in fact require any electronic control component.

In accordance with an alternative embodiment, the actuation means can be electronically activated by means of a control unit of the vehicle when this control unit detects a gear change requested by the pilot, for example a gear upshift commanded by the pilot. The intervention of the control unit does not require a particular control strategy, but only the knowledge of the gear engaged or rather of the direction of the gear change (downshift or upshift).

In accordance with a possible embodiment, the secondary piston is activated through a secondary hydraulic circuit that is independent from the primary hydraulic circuit. Preferably, the actuation means is configured so as to generate, when activated, an increase of pressure in the secondary hydraulic circuit.

In a possible embodiment, the actuation means is connected to a control unit of the vehicle that controls activation and deactivation of the actuation means as a function of the gear change commanded by the pilot.

In an alternative embodiment, the actuation means is of hydraulic type and is activated, directly or indirectly, by means of a gear change pedal mechanism on which the pilot acts.

LIST OF FIGURES

Further features and advantages of the invention will be more apparent from examining the following detailed description of some preferred, but not exclusive, embodiments of a vehicle illustrated by way of non-limiting example with the aid of the accompanying drawings, wherein.

The same reference numbers and letters in the figures identify the same elements or components.

DETAILED DESCRIPTION

With reference to the aforesaid figures, the present invention therefore relates to a saddle-ride type vehicle 1 that includes a control device of a clutch assembly of a saddle-ride type vehicle, where said control device allows torque peaks, during a gear change commanded by a pilot, to be limited. Such a device is particularly suitable for a vehicle provided with a seamless gearbox, but could also be applied in a vehicle provided with a gearbox of different type.

For the purposes of the present invention, the expression "saddle-ride type vehicle" is meant generically as any two-wheeled moped or motorcycle provided with a front wheel and with a rear wheel. In the description below, the vehicle 1 will also be indicated with the term motor vehicle 1 or motorcycle 1. Moreover, for the purposes of the present invention, the expression "gear upshift" is meant as a passage from a lower gear to the next highest gear (e.g., from first gear to second gear or from second gear to third gear). Instead, the expression "gear downshift" or "gear change down" is meant as the passage from a higher gear to the gear immediately below it (e.g., from fourth gear to third gear or from second gear to first gear).

Figure 1:
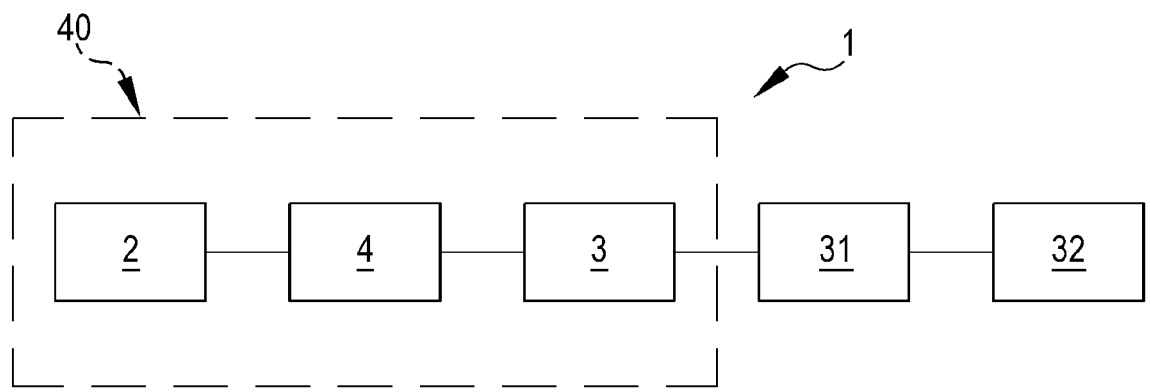
FIG. 1 is a schematic view of a saddle-ride type vehicle according to the present invention.
Figure 2:
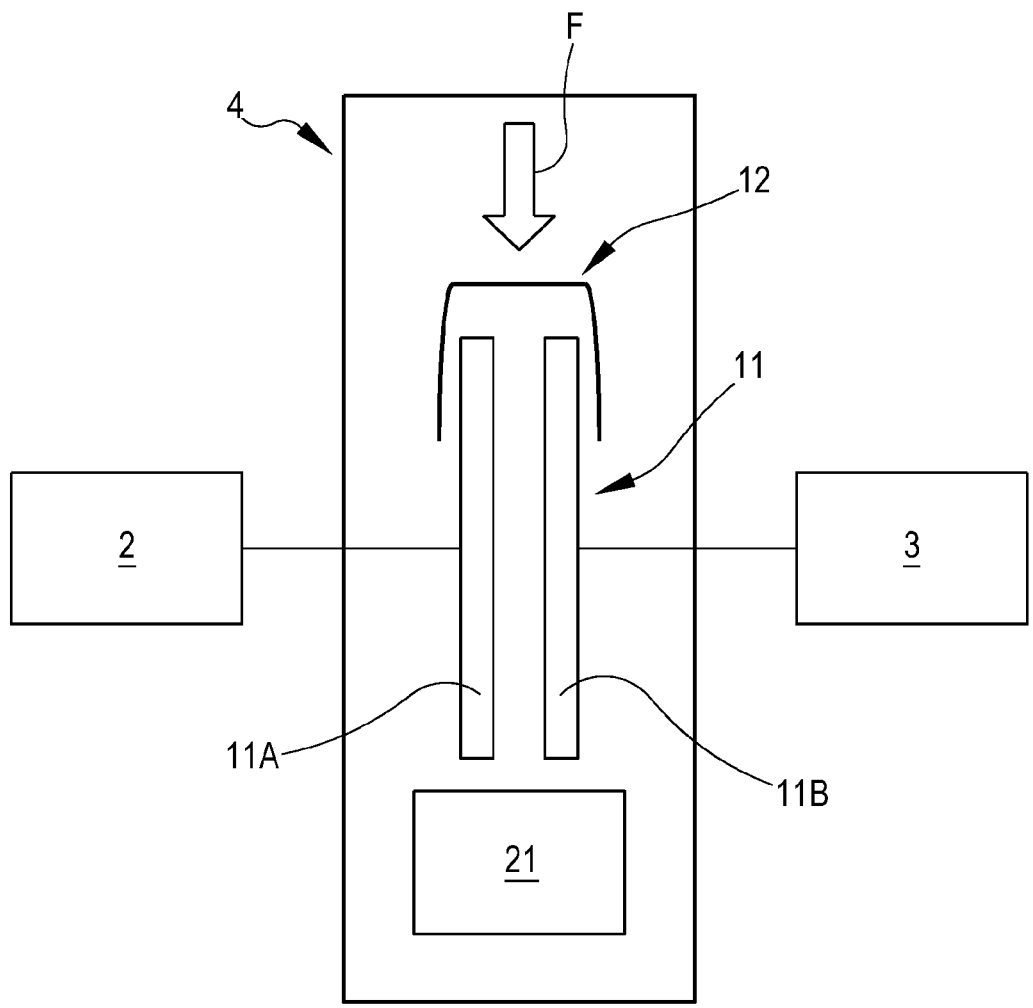
FIG. 2 is a schematic view of an assembly of components of the vehicle schematized in FIG. 1.

In its general configuration, schematized in FIG. 1, a motorcycle 1 according to the invention comprises an engine 2 and a gearbox 3, preferably, but not exclusively, of seamless type, the operating principle and possible configurations of which are known to those skilled in the art. With reference to the gearbox 3, the gears thereof are engaged by the pilot by means of a mechanism that comprises a pedal lever on which the pilot acts, according to a widely known principle.

Interposed between the engine 2 and the gearbox 3 is a clutch assembly 4 that comprises a clutch device 11 and an operating device 21 for commanding said clutch device 11. The gearbox 3 is provided with an input connected to the clutch device 11 and with an output connected, by means of a mechanical transmission 31, to the drive wheel 32 of the motor vehicle 1. As a whole, the engine 2, the gearbox 3 and the clutch assembly 4 form an assembly of components 40 supported by the chassis of the motor vehicle 1 according to a widely known principle.

The clutch device 11 comprises at least one drive element 11A (or drive disc 11A) mechanically connected, directly or indirectly, to the shaft of the engine 2 and a driven element 11B (or driven disc 11B) integral with the input shaft of the gearbox 3. The clutch device 11 further comprises return means 12, in particular of elastic type, for example a spring (of elastic type), configured so as to exert a force such as to keep the two elements 11A, 11B in contact with each other, i.e., in a closure condition of said clutch device 11. In this condition, the motion of the drive element 11A is transferred to the driven element 11B. Possible configurations and construction variants of a clutch device 11 having the features described above are widely known to those skilled in the art. In particular, the clutch device 11 can be of "multi disc" type, comprising a plurality of drive elements, mechanically connected to the shaft of the engine, and a plurality of driven elements mechanically connected to the input shaft of the gearbox, wherein the return means keep the drive elements in contact with corresponding driven elements.

The operating device 21 of the clutch assembly 4, following its activation, causes the mutual detachment of said elements 11A, 11B of the clutch device 11, i.e., disconnects the mechanical transmission between engine 2 and gearbox 3. In practice, the operating device 21 is configured to switch the condition of the clutch device 11 from a closure configuration to an opening configuration.

According to the present invention, the motorcycle 1 comprises a control device 6 of the clutch assembly 4 comprising an actuation means 5 that, during gear change (at least upshift), exerts a predetermined force (indicated with S) in opposition to the force (indicated with F) exerted by the return means 12 so as to generate a slipping between the elements 11A, 11B without however causing a detachment between said elements. For this purpose, said predetermined force S is therefore less than the force F (hereinafter also indicated with the term "load") exerted by the return means 12, i.e., less than the force that keeps the two elements 11A, 11B of the clutch device 11 in contact. Following this condition, as a result of said predetermined force S, during a gear upshift, the transmission of torque between the two elements 11A, 11B is not interrupted, but simply reduced thus absorbing the torque peak that otherwise would be generated as a result of the operating principle of the seamless gearbox.

For the purposes of the present invention, the expression "actuation means" is meant generically as any means formed by one or more elements capable of exerting, when activated, the predetermined force S in the terms indicated above. In particular, the actuation means 5 is activated at least during gear upshift and deactivated upon completion of this gear change (i.e., once the higher gear has been engaged). Therefore, activation and deactivation of the actuation means 5 depend on the instantaneous configuration of the gearbox 3 in reference to which the direction of change (upshift or downshift) is decided and commanded directly by the pilot of the vehicle 1.

Again, according to the invention, the operating device 21 of a clutch assembly 4 comprises a control device 6 according to the invention. This device is of hydraulic type and comprises a primary pump 22 operated by means of a control lever 23 that can be gripped directly by the pilot (see schematic view in FIG. 3). The primary pump 22 is hydraulically connected, through a first hydraulic circuit 16 to a primary piston 24 that acts, directly or indirectly, on one of the two elements 11A,11B of the clutch device 11 (not shown in FIG. 3). In particular, following operation of the control lever 23, the pressure of the oil in the first hydraulic circuit 16, produced by the primary pump 22, determines a force (indicated with T) that causes a shift of the primary piston 24, in opposition to the load (force indicated with F) of the (elastic) return means 12, and consequently detachment of the two elements 11A, 11B of the clutch device 11.

Always according to the invention, the control device 6 comprises a secondary piston 25 operatively connected to the primary piston 24, i.e., so that a shift of the secondary piston 25 causes a corresponding shift of the primary piston 24. According to this embodiment, the actuation means 5 exerts the predetermined force S, indicated above, on said secondary piston 25. This force S is transferred to the primary piston 24 in contrast to the load of the return means 12 to cause slip of the clutch device 11 as indicated above. In any case, the predetermined force S exerted by the secondary piston 25 will always be less than the load of the return means 12.

Again according to the invention, the control device comprises a secondary hydraulic circuit 17 between said actuation means 5 and said secondary piston 25. The actuation means 5 is configured so as to generate, when activated, an increase of pressure in said secondary hydraulic circuit 17. Such an increase of pressure translates into the predetermined force S on the secondary piston 25 and consequently on the primary piston 24 for the purposes indicated above.

Figure 3:
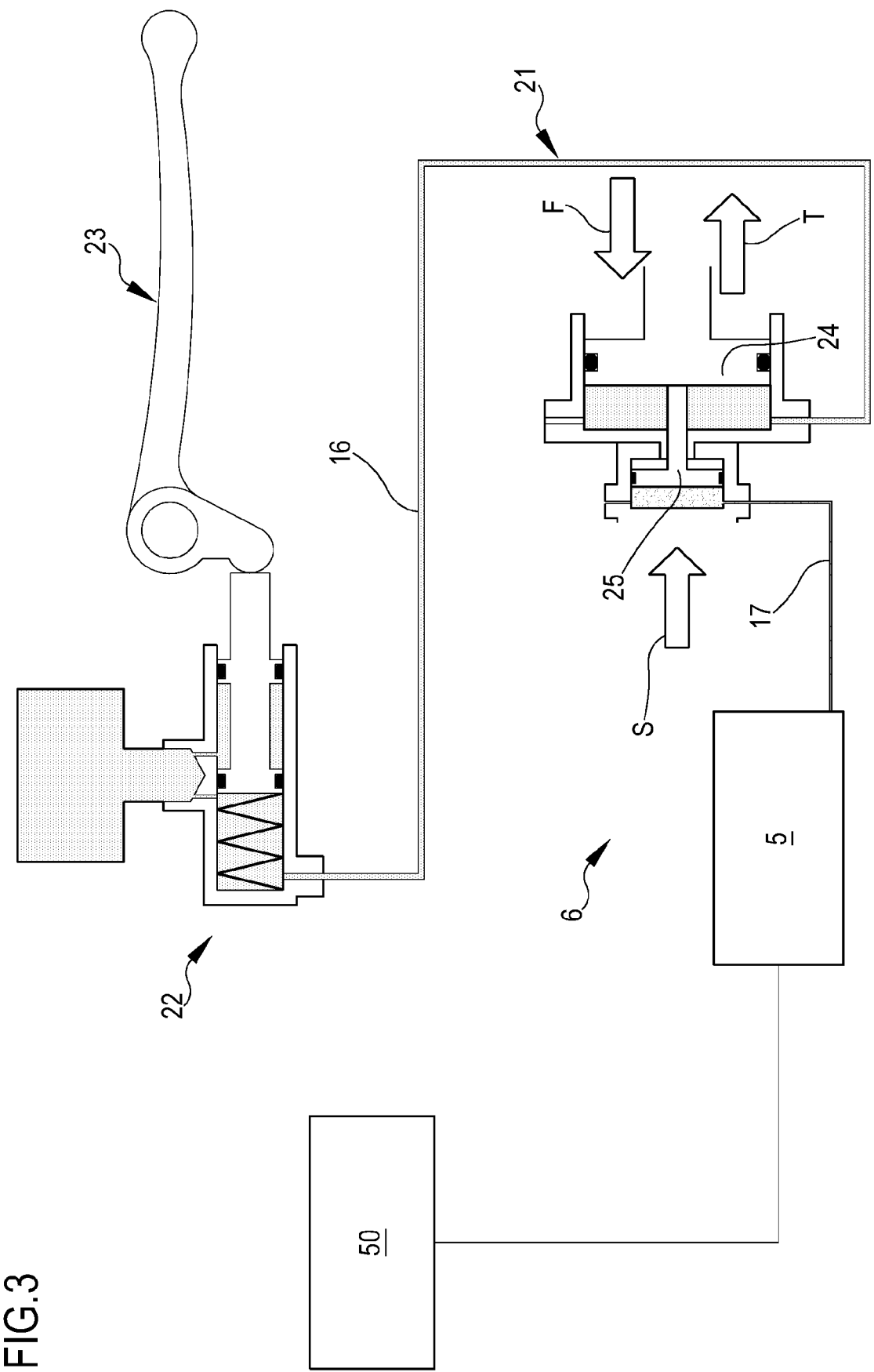
FIGS. 3 and 4 are schematic views respectively of a first and of a second embodiment of a clutch assembly of a saddle-ride type vehicle according to the present invention.

In a possible embodiment, also schematized in FIG. 3, said actuation means 5 is connected to a control unit 50 that controls its activation and deactivation as a function of the gear engaged by the pilot. Preferably, the control unit 50 is the same unit that controls switching on and switching off of the engine 2. The control unit 50 of the vehicle 1 recognizes the direction of the gear change (upshift or downshift) by means of systems know to those skilled in the art (for example based on the use of a transducer of "quick shifter" type). In a possible embodiment, the control unit 50 activates the actuation means 5 only when it recognizes a gear upshift, while in the case of a gear downshift, the actuation means 5 remains deactivated.

In the case in which the actuation means 5 is of hydraulic type, as indicated above, its activation leads to an increase of the pressure of the oil inside the secondary circuit 17 which, acting on the secondary piston 24, causes the slipping of the clutch. Upon completion of engagement of the gear, the control unit 50 deactivates the actuation means 5 thereby returning the clutch device 11 to the condition prior to the gear change.

The possibility of the actuation means 5 being of electric or electromechanical type and acting directly on the secondary piston 25 or alternatively directly on the primary piston 24 of the operating device 21 also falls within the scope of the present invention.

Figure 4:
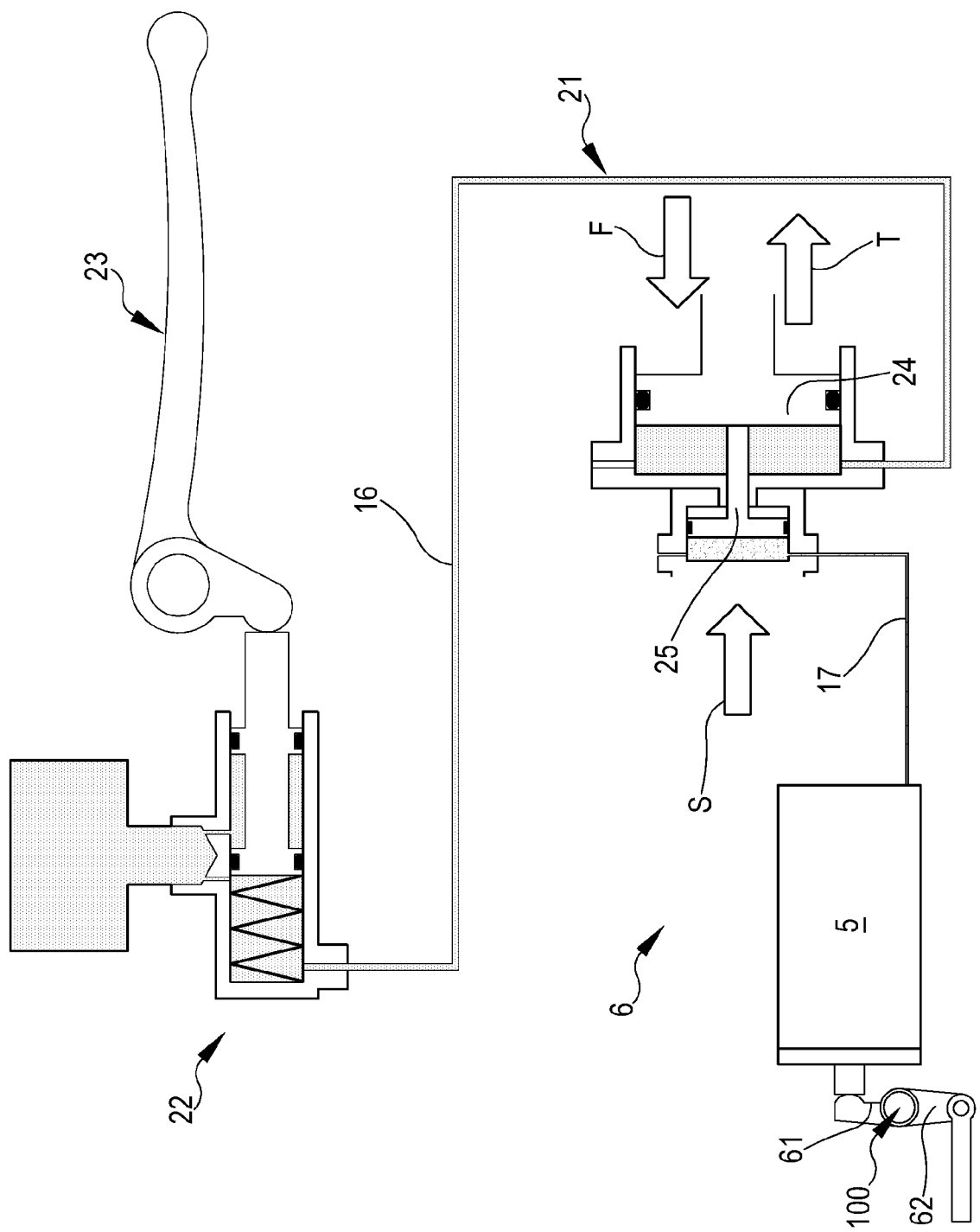

In accordance with a possible variant of embodiment, schematized in FIG. 4, the actuation means 5 is of hydraulic type and is directly activated, directly or indirectly, by means of a control lever 61 mechanically activated by the pilot when operating the pedal mechanism for engaging the gear. In other words, according to this embodiment, activation of the actuation means 5 is performed mechanically and not electronically, i.e., without a direct action of a control unit. In the schematic view of FIG. 4, the control lever 61 is illustrated as an extension of a gear lever 62 of the pedal mechanism connected to the axis 100 of the drum of the gearbox 3. Each time that this gear lever is rotated, by means of the intervention of the pilot, in a direction corresponding to a gear upshift, the actuation means 5 is activated so as to increase the pressure of the oil in the secondary circuit 17 and to cause the slipping of the elements 11A, 11B of the clutch device.

The control device of the clutch assembly and the vehicle according to the invention allow the aims and objects set to be fully achieved. In particular, during a gear upshift, the torque peaks are absorbed causing slip of the clutch and therefore completely independently from the inertia of the drive shaft and in general from the performance of the engine itself. In particular, the slipping of the clutch is obtained by means of the use of an actuation means, the activation of which can be completely mechanical or alternatively electronic, but in any case without requiring control strategies.

The invention claimed is:
1. A saddle-ride type vehicle comprising:
an engine;
a gearbox;
a clutch assembly interposed between the engine and the gearbox, wherein the clutch assembly comprises:
a clutch device comprising at least one drive element integral with a shaft of the engine, at least one driven element integral with an input shaft of the gearbox, and return means that keep the at least one drive element and the at least one driven element in contact in a closure condition of the clutch device;
an operating device of the clutch device to cause, in opposition to the return means, a mutual detachment of the at least one drive element and the at least one driven element up to an opening condition of the clutch device;
a control device comprising an actuation means that, during a gear change performed by the gearbox following a pilot command, exerts a predetermined force in contrast to a force exerted by the return means, the predetermined force being less than the force exerted by the return means so as to cause the clutch device to slip without the opening condition being reached;
wherein the operating device is of hydraulic type and comprises a primary pump operated via a control lever, wherein the primary pump is hydraulically connected, through a primary hydraulic circuit, to a primary piston acting on at least one of the at least one drive element and the at least one driven element in opposition to the return means so that, as a result of an action on the control lever, the primary piston exerts an action on the at least one drive element and the at least one driven element determining the opening condition;

wherein the control device comprises a secondary piston connected to the primary piston, wherein the actuation means exerts, directly or indirectly, the predetermined force on the secondary piston, the predetermined force being transferred to the primary piston in opposition to the force of the return means.

2. The vehicle of claim 1, wherein the secondary piston is activated through a secondary hydraulic circuit that is independent from the primary hydraulic circuit.

3. The vehicle of claim 2, wherein the actuation means is configured to generate, when activated, an increase of pressure in said secondary hydraulic circuit.

4. The vehicle of claim 1, wherein the actuation means is mechanically activated when a gear change is required by the pilot.

5. The vehicle of claim 1, wherein the actuation means is activated electronically by a control unit of the vehicle when the control unit detects a gear change requested by the pilot.

6. The vehicle of claim 1, wherein the vehicle comprises a control unit configured to control activation and deactivation of the actuation means.

7. The vehicle of claim 1, wherein the actuation means is of hydraulic type and is activated, directly or indirectly, via a control lever that is activated, directly or indirectly, via a pedal mechanism for gear change.

8. A saddle-ride type vehicle comprising:
an engine;
a gearbox;
a clutch comprising at least one drive element integral with a shaft of the engine, and at least one driven element integral with an input shaft of the gearbox;
an elastic spring configured to exert a force keeping the at least one drive element and the at least one driven element in contact in a closure condition of the clutch;
a primary hydraulic pump operated via a control lever, wherein the primary pump is hydraulically connected, through a primary hydraulic circuit, to a primary piston, wherein as a result of an action on the control lever the primary piston exerts an action on the at least one drive element and the at least one driven element in opposition to the force exerted by the elastic spring, to cause a mutual detachment of the at least one drive element and the at least one driven element and determine an opening condition of the clutch;
a secondary piston connected to the primary piston; and
one or more actuators configured, during a gear change performed by the gearbox following a pilot command, to exert a predetermined force on the secondary piston and transferred thereby to the primary piston in opposition to the force exerted by the elastic spring, the predetermined force being less than the force exerted by the elastic spring so as to cause the clutch to slip without the opening condition being reached.

9. The vehicle of claim 8, wherein the secondary piston is activated through a secondary hydraulic circuit that is independent from the primary hydraulic circuit.

10. The vehicle of claim 9, wherein the one or more actuators are configured to generate, when activated, an increase of pressure in said secondary hydraulic circuit.

11. The vehicle of claim 8, wherein the one or more actuators are mechanically activated when a gear change is required by the pilot.

12. The vehicle of claim 8, wherein the one or more actuators are activated electronically upon detection of a gear change requested by the pilot.

13. The vehicle of claim 8, comprising a vehicle control unit configured to control activation and deactivation of the one or more actuators.

14. The vehicle of claim 8, wherein the one or more actuators are of hydraulic type and activated, directly or indirectly, via a control lever that is activated, directly or indirectly, via a pedal lever for gear change.

* * * * *